US012181854B2

(12) United States Patent
Bretschneider et al.

(10) Patent No.: US 12,181,854 B2
(45) Date of Patent: Dec. 31, 2024

(54) PRODUCTION USING A MACHINE TOOL OF FACES DEFINABLE BY CONE SEGMENTS

(71) Applicant: Siemens Aktiengesellschaft, Munich (DE)

(72) Inventors: Jochen Bretschneider, Owingen (DE); Lars Immenroth, Zwickau (DE); André Vieweg, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/018,755

(22) PCT Filed: Jul. 7, 2021

(86) PCT No.: PCT/EP2021/068838
§ 371 (c)(1),
(2) Date: Jan. 30, 2023

(87) PCT Pub. No.: WO2022/022963
PCT Pub. Date: Feb. 3, 2022

(65) Prior Publication Data
US 2023/0244206 A1   Aug. 3, 2023

(30) Foreign Application Priority Data

Jul. 31, 2020   (EP) .................................... 20188968

(51) Int. Cl.
*G05B 19/18*   (2006.01)
*G05B 19/4093*   (2006.01)

(52) U.S. Cl.
CPC ..... *G05B 19/182* (2013.01); *G05B 19/40938* (2013.01)

(58) Field of Classification Search
CPC ............ G05B 19/182; G05B 19/40938; G05B 19/4083; Y02P 90/02
(Continued)

(56) References Cited

U.S. PATENT DOCUMENTS

| 11,243,676 B2 * | 2/2022 | Fujitsuka ............ G06F 3/04886 |
| 2004/0143362 A1 * | 7/2004 | Matthews .......... G05B 19/4097 700/182 |

(Continued)

FOREIGN PATENT DOCUMENTS

| DE | 19642661 A1 * | 4/1998 | ............... B23B 5/06 |
| DE | 10 2012 106 849 A1 | 5/2014 | |

(Continued)

OTHER PUBLICATIONS

PCT International Search Report and Written Opinion of International Searching Authority mailed Oct. 29, 2021 corresponding to PCT International Application No. PCT/EP2021/068838 filled Jul. 7, 2021.

*Primary Examiner* — Chun Cao
*Assistant Examiner* — Michael Tang
(74) *Attorney, Agent, or Firm* — Henry M. Feiereisen LLC

(57) ABSTRACT

In a method for producing and/or machining a non-conical face of a workpiece defined by a segment of a cone, in particular a sealing face of a multiple-eccentric shut-off valve, using a machine tool having at least two linear axes and at least one rotary axis controlled by a numerical controller for generating a relative movement between a tool and the workpiece, a cycle is provided on the numerical controller and retrieved by a user of the machine tool. The user parameterizes the cycle, whereafter a part program is generated by the cycle for execution by the numerical controller. The executed part program generates the relative (Continued)

movement along a path determined by the part program to produce and/or machine the face of the workpiece.

15 Claims, 5 Drawing Sheets

(58) Field of Classification Search
USPC .......................... 700/160; 251/305, 173, 359
See application file for complete search history.

(56) References Cited

U.S. PATENT DOCUMENTS

| | | |
|---|---|---|
| 2010/0228384 A1 | 9/2010 | Neumaier et al. |
| 2012/0282055 A1* | 11/2012 | Marx ...................... B23F 21/06 |
| | | 409/37 |
| 2018/0314227 A1 | 11/2018 | Bretschneider |
| 2019/0310608 A1* | 10/2019 | Amer ................. G05B 19/4097 |
| 2020/0225642 A1* | 7/2020 | Gortz ..................... G05B 19/19 |
| 2020/0240475 A1* | 7/2020 | Miller ................... F16C 33/605 |
| 2021/0271226 A1* | 9/2021 | Saffert ............... G05B 19/4086 |
| 2022/0317656 A1* | 10/2022 | Kitamura ........... G05B 19/4068 |

FOREIGN PATENT DOCUMENTS

| | | |
|---|---|---|
| DE | 10 2018 100 474 A1 | 7/2020 |
| EP | 2 216 688 A2 | 8/2010 |
| EP | 3 151 073 A1 | 4/2017 |

\* cited by examiner

PRODUCTION USING A MACHINE TOOL OF FACES DEFINABLE BY CONE SEGMENTS

CROSS-REFERENCES TO RELATED APPLICATIONS

This application is the U.S. National Stage of International Application No. PCT/EP2021/068838, filed Jul. 7, 2021, which designated the United States and has been published as International Publication No. WO 2022/022963 A1 and which claims the priority of European Patent Application, Ser. No. 20/188,968.0, filed Jul. 31, 2020, pursuant to 35 U.S.C. 119 (a)-(d).

BACKGROUND OF THE INVENTION

The invention relates to a method for producing and/or machining a non-conical face of a workpiece, which face can be defined by a segment of a cone, using a machine tool, the machine tool having at least two linear axes and at least one rotary axis for generating a relative movement between a tool and the workpiece, and having a numerical controller for controlling the axes. The invention further relates to a cycle for performing a method of this type, a numerical controller having a cycle of this type and a machine tool having a numerical controller of this type.

Machine tools are nowadays controlled with the help of a control device, such as a CNC controller for example. In this case the control device makes use of a parts program to "control" the movements of machine elements and thus the movements of a tool, which for example is inserted into the machine using a tool holding apparatus, relative to a workpiece, which is likewise inserted into the machine. In this case it is clear to the person skilled in the art that the term "control" relates to normal linguistic usage and not to "control" in the control engineering sense. "Control" here primarily means the position control of axes, behind which are concealed control operations in the control engineering sense.

The parts program is here composed at least preponderantly of control commands, which are read and interpreted by the control device. In accordance with the control commands the control device controls the movements of the machine elements of the machine tool and thus the movement of the tool relative to the workpiece.

To create a parts program, movement information about movements of the tool to be performed is in this case generated by a CAM system (Computer Aided Manufacturing), preferably in a standardized data format, and is read by a downstream postprocessor. The postprocessor uses movement information generated by the CAM system, the kinematic and machine data of the machine tool and the command set of the CNC controller and the command set of the PLC controller to generate a parts program adapted for the respective actual machine tool on which the machining operation is to take place, in the form of control commands adapted to the actual control device of the machine tool. In such a way the movement information generated by the CAM system, preferably in a standardized data format, is converted by the postprocessor into control commands that can be read by the control device and are adapted to the respective control device.

The postprocessor in this case takes into account not only the actually available CNC command set but also the actual machine-specific kinematic circumstances of the machine tool, such as for example kinematics, geometric proportions, maximum traversing ranges of the drive axes and maximum velocities of the machine elements. This data is present in the form of machine data. Machine-specific PLC functionalities (Programmable Logic Control), such as for example lubrication, tool changes, door locking, etc., are further taken into account by the postprocessor during the generation of the control commands, wherein the actually available PLC functionalities are available to the postprocessor in the form of PLC command sets.

Cycles are programs stored in the CNC controller that can be retrieved in the manner of a subprogram and enable both the programming and the performance of specific machining operations in a convenient manner directly on the machine, in other words without recourse to an external CAM system. In most cases all that is needed for the programming or machining is for the user to retrieve the cycles and to input a few parameters. The CNC controller then independently generates or parameterizes the corresponding parts program for machining the workpiece. It is known for drilling cycles, milling cycles or turning cycles to be created and used. In particular, turning cycles are known, by means of which a rotationally symmetrical cone can be turned on a component, in particular a shaft, by specifying two radii and a height specification.

A particular challenge in path generation is the generation of movement paths for the production of valve seats or closures of shut-off valves. For example, in the chemical industry, the oil and gas industry, or the water and wastewater industry the use of what are known as eccentric shut-off valves is standard. In this case not only double offset valves but increasingly triple offset valves (triple offset butterfly valves) and even quadruple offset valves are employed for industrial use.

Because of the eccentricities the sealing faces of the valves have a complex, in particular non-rotationally symmetrical and thus non-conical surface geometry, in particular in respect of a surface normal of the components in question or of a workpiece axis, to generate which it has until now been necessary to create parts programs in the manner set out in the introduction using a CAD/CAM system and a postprocessor.

Known from the printed publication DE 10 2019 100 474 A1 is a method for controlling a machine tool, comprising: providing a machine tool; providing a manufacturing sequence comprising multiple manufacturing steps, at least one tool and one tool path being defined for each manufacturing step; generating control data, the control data comprising: control commands, the control commands specifying machining operations of the machine tool according to the manufacturing steps of the manufacturing sequence, and the machine tool being designed to convert the control commands into the machining operations, and additional data, the additional data comprising at least one list which specifies parameters extracted from the control commands; providing the control data in a control unit of the machine tool; receiving input data in the control unit, the input data specifying a user input; generating modified control commands by way of the control unit, the modified control commands being generated from the control commands in accordance with the additional data and the input data; and actuating the machine tool by the control device by way of the modified control commands.

Known from the printed publication EP 2 216 698 A2 are a method and an apparatus for generating transformed control data for controlling a tool on a machine tool for machining a workpiece clamped into a clamping means of the machine tool, comprising the method step of determining control data which specifies which first tool path is to be traversed by the tool of the machine tool with which first tool orientation for machining the clamped workpiece, if the workpiece is clamped into the clamping means in accordance with a clamping situation setpoint state that specifies a setpoint state of a clamping situation of the workpiece clamped into the clamping means, characterized by the further method steps of determining a clamping situation actual state that specifies an actual state of the clamping situation of the workplace clamped into the clamping means, determining a clamping situation deviation between the clamping situation actual state and the clamping situation setpoint state, and generating transformed control data by carrying out a transformation of at least part of the ascertained control data as a function of the determined clamping situation deviation, the transformed control data specifying which second tool path is to be traversed by the tool of the machine tool with which second tool orientation for machining the clamped workpiece if the workpiece is clamped into the clamping means in accordance with the determined clamping situation actual state with the ascertained clamping situation deviation.

Known from the printed publication EP 3 151 073 A1 is a method for generating control data for controlling a tool on a machine tool for processing a clamped workplace by way of a treatment process, in particular machining, the machine tool comprising a control apparatus and a tool for controlling the tool in relation to the clamped workpiece with a three-dimensional free tool movement by generating a path program on the basis of a setpoint geometry of the generated setpoint parameters for controlling the machine tool, the path program describing at least one path, the path consisting of a plurality of supporting points and line elements and each line element connecting a pair of the supporting points to one another, and the control of the machine tool being effected in accordance with the generated path program. The method comprises the following steps: —Detecting actual parameters of the treatment process by a feedback loop, —Iteratively optimizing the path program on the basis of detected actual parameters for generating a new path_program_new with a new path_new, which during the treatment are supplied to the machine tool and which dynamically change and/or dynamically replace the previous path program and the previous path.

An object of the present invention is to simplify the production or machining of sealing faces in the case of multiple-eccentric shut-off valves.

SUMMARY OF THE INVENTION

This object is achieved by a method for producing and/or machining a non-conical face of a workpiece, which face can be defined by a segment of a cone, using a machine tool, the machine tool for generating a relative movement between a tool and the workpiece having at least two linear axes and at least one rotary axis as well as a numerical controller for controlling the axes, with the following steps:
provision of a cycle on the numerical controller,
retrieval of the cycle by a user of the machine tool,
parameterization of the cycle by the user,
generation of a parts program that can be executed by the numerical controller by means of the cycle and the numerical controller,
execution of the parts program by means of the numerical controller to generate the relative movement along a path for producing or machining the face of the workpiece.

In a preferred form of embodiment of the invention the machining of the workpiece takes place in the form of a turning operation. The invention is however not restricted to this form of embodiment. For example, a milling operation is likewise possible for the production of the workpiece.

Furthermore the invention is not restricted to the metal-cutting machining of a workpiece, but thus other machining operations are also possible, for example material-application machining.

The generation of the parts program that can be executed by the numerical controller can take place by means of the cycle and the numerical controller immediately after the retrieval of the cycle and the input of the requisite parameters by the operator. Furthermore, the generation by the controller of the parts program that can be executed by the numerical controller can also take place at the runtime, in other words during the execution of a higher-level CNC program at the time of the retrieval of the cycle.

The invention offers the advantage that non-conical faces that can be defined by a segment of a cone can now, by means of what is known as "workshop-oriented programming", be "programmed" directly on the CNC controller, in other words without recourse to an external CAM system. This does not however relate precisely to programming in the traditional sense of the term, in which the relative movement between the tool and the workpiece has to be specified ("programmed") block by block, but the procedure is restricted to retrieval and parameter input (parameterization) of the cycle in question, by which the path to be traversed for the machining of the workpiece is then generated automatically by the CNC controller.

Furthermore, this procedure allows the machine operator to make adjustments easily and on a situation-dependent basis, without having to create the CNC program anew for this at the external workplace. Examples of such adjustments are:
taking account of the actual setup of the workpiece, for example by specifying offsets;
specifying too radius or tool abrasion;
including dynamic values of axes involved (for example maximum speed);
checking or establishing the available working space for the manufacture (for example axis limitations);
checking or establishing the correct axis identifiers (for example x, z, c1);

Further advantages of this type of workshop-oriented programming are:
all input parameters of the cycle in the parts program are retained for documentation purposes;
no extensive work preparation is necessary.

A cone is by definition a geometric body that is created when all points of a delimited and continuous face element lying in a plane are connected in a straight line to a point (the tip) outside the plane.

The face element refers to the base area, its delimiting line the guide curve, and the point the tip or vertex of the cone. A cone therefore has a tip (the vertex point), an edge (the guide curve) and two faces (the lateral face and the base area). If the face element (the base area) is a circular disk, the body thus formed is referred to as a circular cone. The base area can however be embodied arbitrarily, in particular also as non-circular or non-elliptical.

A distinction is made in particular between cones with a circular base area and a height line (straight circular cone or turning cone) running perpendicularly through the center point of the base area or circular cones with a circular base area, the height line of which does not include the center point of the circle (oblique circular cone or elliptical cone).

A "conical face", or cone for short, is understood to mean a rotationally symmetrical face that corresponds to the shape of the lateral face of a truncated cone of a straight circular cone (turning cone).

A "segment of a cone" (cone segment) within the meaning of the invention is understood to mean any face on the lateral face of a cone.

For many technical applications and in particular applications in connection with the invention, the production or machining in particular of such faces that can be defined by segments of oblique cones, in particular of oblique circular cones, is of interest.

In addition, in connection with the invention the production or machining of such faces, which is of interest for many technical applications, should also be emphasized, it being possible for such faces to be defined by a segment of a cone, in particular of a straight circular cone, having a height line that is not aligned in parallel to a workpiece normal. The cone in question is thus not aligned in parallel to the workpiece (to a surface normal of the workpiece), but is pivoted ("turned") in comparison thereto in space. Although when a straight circular cone is intersected in this way by a workpiece all points of intersection thus lie on the lateral face of the straight circular cone, and thus of a rotationally symmetrical body, the workpiece has a non-rotationally-symmetrical and therefore also non-conical (intersecting) face.

The generation of a "non-conical face" of the workpiece within the meaning of the invention can thus result from the fact that the cone in question is itself not rotationally symmetrical, for example an oblique cone, or else that although the cone is rotationally symmetrical (in other words a turning cone), it is however pivoted in space in comparison to the workpiece—as described above.

If a cone is intersected through 2 planes, the part of the lateral face situated therebetween is referred to below as an annularly closed cone segment. The two planes and the cone segment therefore form a continuous closed face. The two planes create a closed band on the lateral face of the cone.

Such annularly closed cone segments, created from the intersection of a cone by two parallel planes, are in particular of interest for technical applications.

The invention is not however restricted to the aforementioned, preferred geometric variants of cone segments, but is applicable in principle for any (geometrically describable) non-conical faces that can be defined by a segment of a cone.

From a mathematical point of view any face intended for production or machining according to the invention can be established by the specifications relating to the geometry of the cone in question and specifications relating to the size and position of the face on the lateral face of the cone directly at the controller by corresponding user inputs.

Advantageously in connection with the invention, the geometric description of the relevant face of the completed workpiece (in other words the workpiece surface) is sufficient for the cycle to be able to generate the appropriate parts program therefrom. If for example the production of a desired face (workpiece surface) is not possible in one work step, for example because the maximum possible infeed with the tool used does not permit this, the CNC controller in conjunction with the cycle automatically splits it—in a manner known per se—into several work steps.

The inventive method is suitable in particular for machining or production of a sealing face of a closure part or of a valve seat (the corresponding counterpart to the closure part) of a shut-off valve. A hollow-cylindrical metal part is usually used as the workpiece blank for such a valve seat, and a cylindrical metal part is used for the closure.

The advantages of the invention are particularly evident when the shut-off valve is an eccentric shut-off valve, in particular a multiple-eccentric shut-off valve, for example a triple eccentric shut-off valve (triple offset butterfly valve). Because of the complex geometric shape of the sealing faces of such valves it is no longer possible to program the paths required for machining "manually". Without the invention the requisite parts programs could hence no longer be created on the CNC controller itself, but only on an external CAM system by experts trained thereon.

There are several different options for the production of the sealing faces of a multiple-eccentric shut-off valve by turning, these also depending on the type of machine used.

On the one hand a compensating movement required to generate the eccentricity can take place radially in a linear axis and be programmed accordingly.

In this form of embodiment the parts program is preferably generated in polar coordinate format. Besides the linear axis mentioned, the infeed axis (Z direction) and a rotary axis are also required as further axes. The machining is therefore possible with a relatively simple 3-axis machine.

Another variant provides for a compensating movement radially in two linear axes required to generate the eccentricity. The parts program is in this case advantageously generated in Cartesian format, including orientation, which must be based on an active transformation.

The machine tool must in this case have the following kinematics:
  a positionable rotary axis
  a linear axis collinear to the rotary axis (feed movement)
  a linear axis radial to the rotary axis (infeed movement/ compensating movement)
  a linear axis radial to the rotary axis (infeed movement/ compensating movement)

Therefore at least a 4-axis machine is required for the performance of the machining.

The geometric information required for manufacture of the sealing face is advantageously input into the CNC controller by the operator via a cycle mask.

The object set out in the introduction is further achieved by a cycle for a numerical controller for performing a method as claimed in claim 14.

The object set out in the introduction is further achieved by a numerical controller for executing a cycle in accordance with claim 15.

The object set out in the introduction is further achieved by a machine tool having a numerical controller as set forth hereinafter.

BRIEF DESCRIPTION OF THE DRAWING

The invention is explained in greater detail below using exemplary embodiments. In this case.

DETAILED DESCRIPTION OF PREFERRED EMBODIMENTS

Figure 1:
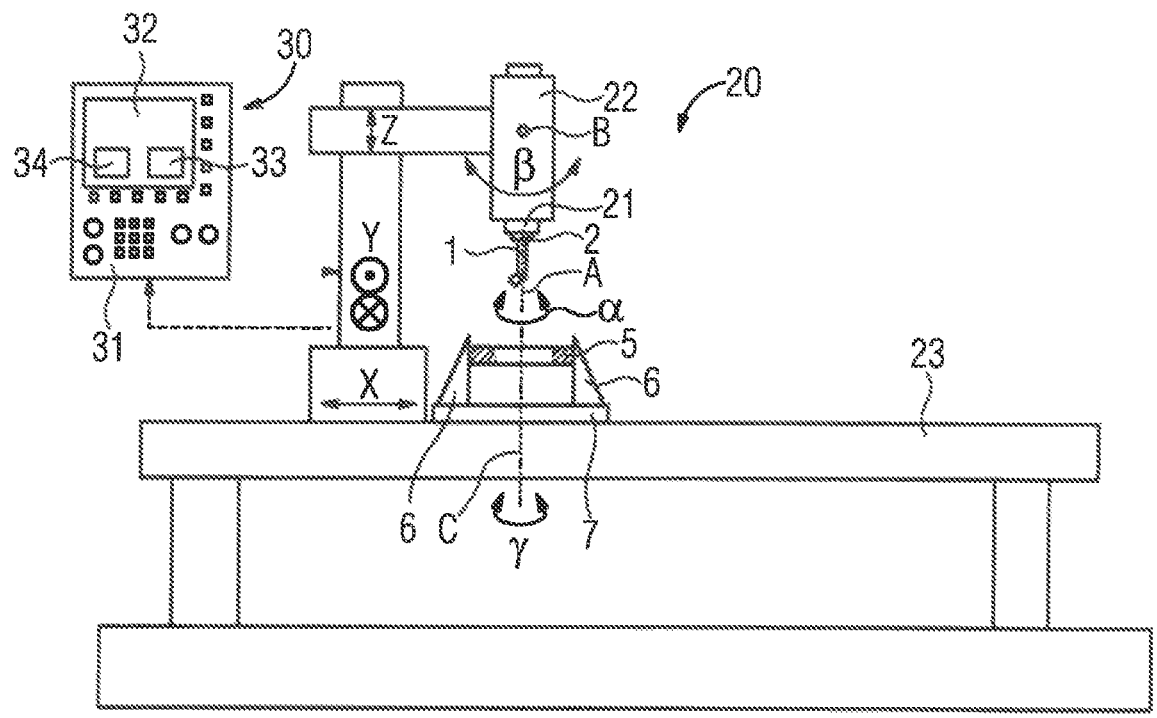
FIG. 1 shows a machine tool for performing an inventive method.

FIG. 1 schematically shows a machine tool 20. In the context of the exemplary embodiment the machine tool 20 has six machine axes, through which a relative movement can be performed between a tool 1, which in the context of the exemplary embodiment is present in the form of a turning tool 1, and a workpiece 5, in the exemplary embodiment indicated as a valve seat 5 of a multiple-eccentric shut-off valve. The tool 1 is in this case clamped in a tool holder 2, which is connected to a tool spindle 21 driven by a position-controlled motor 22. The workpiece 5 is fastened to a workpiece table 7 by clamping means 6.

The turning tool 1 can be moved with the machine 20 shown in the exemplary embodiment in a position-controlled translatory manner in the X, Y and Z direction 1 with the drives not shown in FIG. 1 for the sake of clarity. Besides the three linear axes the machine tool 20 shown further comprises the two position-controlled rotary axes A and B, likewise shown in FIG. 1, with which the tool 1 can be turned about the respective axis and likewise can be aligned relative to the workpiece 5 in a position-controlled manner through the angular positions $\alpha$ and $\beta$.

In addition the machine 20 has a third position-controlled rotary axis C, which runs in parallel to the Z axis, and in respect of which the workpiece table 7 is mounted so as to be rotatable relative to a stationary machine frame 23. As a result the workpiece 5 can also be positioned in an angular position $\gamma$ relative to the tool 1. Here too the drive has not been shown for the sake of clarity.

Depending on the machining to be carried out, speed-controlled operation with respect to the rotary axes A and/or C is also possible in the case of the machine tool 20 shown.

The machine tool 20 in accordance with the exemplary embodiment thus has six machine axes (the 3 linear axes X, Y and Z plus the 3 rotary axes A, B and C), i.e. it is what is known as a 6-axis machine tool (6-axis machine) 20.

It may be mentioned at this point that the machine tool 20 can of course also have more, or fewer, than six machine axes.

The machine tool 20 is connected to a numerical controller 30, which uses a parts program 33 and/or a manual input to determine position setpoint values x, y, z, $\alpha$, $\beta$ and $\gamma$ to control a relative movement taking place between the tool 1 and the workpiece 5. The numerical controller 30 determines the position setpoint values using the parts program 33, in which the movement to be carried out by the tool 1 in respect of the workpiece 5 is defined in the form of commands. Alternatively or additionally the movement of the tool 1 and/or the workpiece 5 can also be specified by an operator on site at the machine tool 20 by means of a manual input via a control facility 31 in conjunction with a display device 32 of the numerical controller 30. To this end the control facility 31 has in particular input fields, buttons and rotary controls.

The parts program 33 is in this case normally generated outside the numerical controller 30 by an external CAM/CAD system (not shown) and what is known as a postprocessor (not shown) that may be connected downstream of the CAM/CAD system, and from there is transferred to the numerical controller 30.

During the execution of the parts program 33 the numerical controller 30 generates in a specific cycle, the interpolation cycle, both position setpoint values x, y and z for the linear axes and $\alpha$, $\beta$ and $\gamma$ (angular positions) for the rotary axes. Thanks to these position setpoint values the tool 1 is moved along a movement path with a predefined orientation relative to the workpiece 5.

In accordance with the invention a cycle 34 for producing and/or machining non-conical faces of the workpiece 5 is present on the numerical controller 30 in accordance with the exemplary embodiment, and can be defined by a segment of a cone, i.e. can be described mathematically. As indicated in the figure, the workpiece 5 in the exemplary embodiment is a valve seat 5 of a triple eccentric shut-off valve. Thanks to a corresponding parameterization of the cycle 34, which will be looked at in greater detail later, the desired machining, in particular a turning operation of the sealing face, is possible.

Besides the aforementioned turning operation of the valve seat 5, the 6-axis machine shown could likewise be used, for example, to perform milling of the valve seat 5, in which the tool 1 is designed as a milling cutter (not shown) rotating about the spindle axis A, said milling cutter being positioned in a position-controlled manner in the X, Y and Z direction and in which the valve seat 5 is preferably fixed in place. The milling cutter would in this case be driven in a speed-controlled manner by the motor 22 and the spindle 21.

Figure 2:
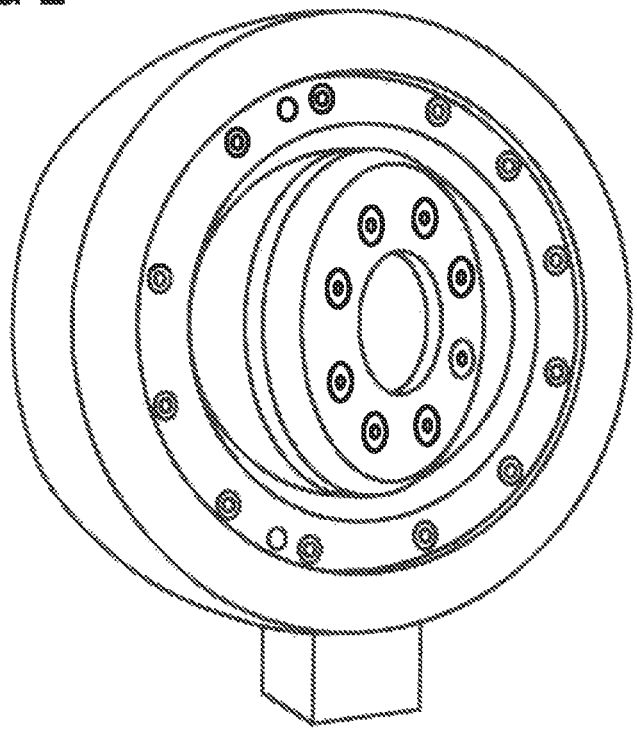
FIG. 2 shows a triple eccentric shut-off valve.

FIG. 2 shows a triple eccentric shut-off valve (triple offset butterfly valve), as is employed for example in the chemical industry, the oil and gas industry, or the water and wastewater industry. A particular challenge of these valves is the production of the requisite sealing faces, such as for example the valve seat indicated in FIG. 1. The creation of parts programs for machine tools for producing these sealing faces has hitherto only been possible using CAD/CAM systems.

Figure 3:
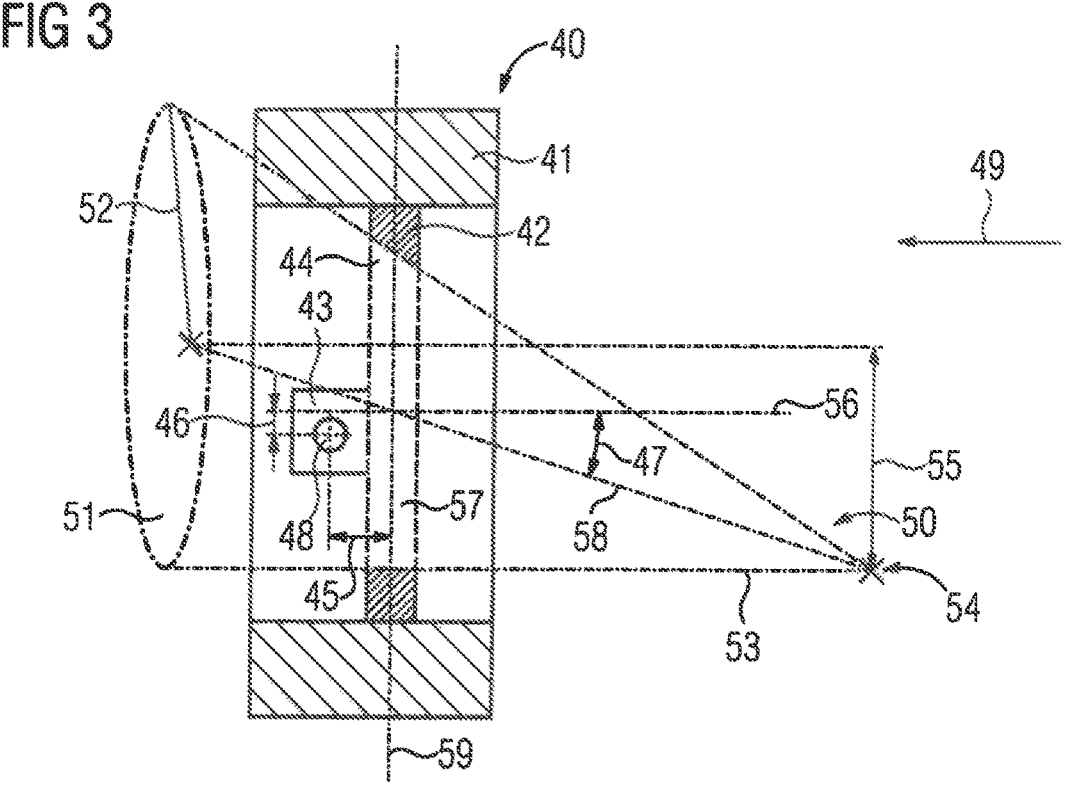
FIG. 3 shows a triple eccentric shut-off valve in a schematic representation.

FIG. 3 illustrates a triple eccentric shut-off valve 40 in a schematic representation. The valve seat 41 of the shut-off valve 40 with the sealing face 42 can be seen in the figure. Furthermore, the rotatably mounted closure part 43 of the shut-off valve 40 with the sealing face 44 can be seen.

The geometry of the sealing faces 42 and 44 can be described using an oblique circular cone 50, likewise shown by way of example in FIG. 3, with the base area 51, the radius 52, the height 53, the tip 54 and the deviation 55. The two parallel surfaces of the valve seat 41 and of the closure part 43 result in an annuiarly closed cone segment 57 as an intersection on the lateral face of the cone 50. The sealing faces 42 and 44 lie on this annuiarly closed cone segment 57 of the lateral face of the cone 50 and can hence be precisely described mathematically.

Further, the three eccentricities of the shut-off valve 40 can be seen in FIG. 3. A First eccentricity 45 results from an offset of a pivot point 48 of the closure part 43 compared to a first center line 59, running in the vertical direction, of the shut-off valve 40 in the direction of flow 49 of the shut-off valve 40. A second eccentricity 46 results from an offset of the pivot point 48 of the closure part 43 compared to a second center line 56, running in the horizontal direction, of the shut-off valve 40 in a direction perpendicular to the direction of flow 49 of the shut-off valve 40. A third eccentricity corresponds to an angle 47 between the second, horizontal center line 56 of the shut-off valve 40 and a cone axis 58 running through the center point of the base area of the cone 50 and the tip 54 of the cone 50.

Figure 4:
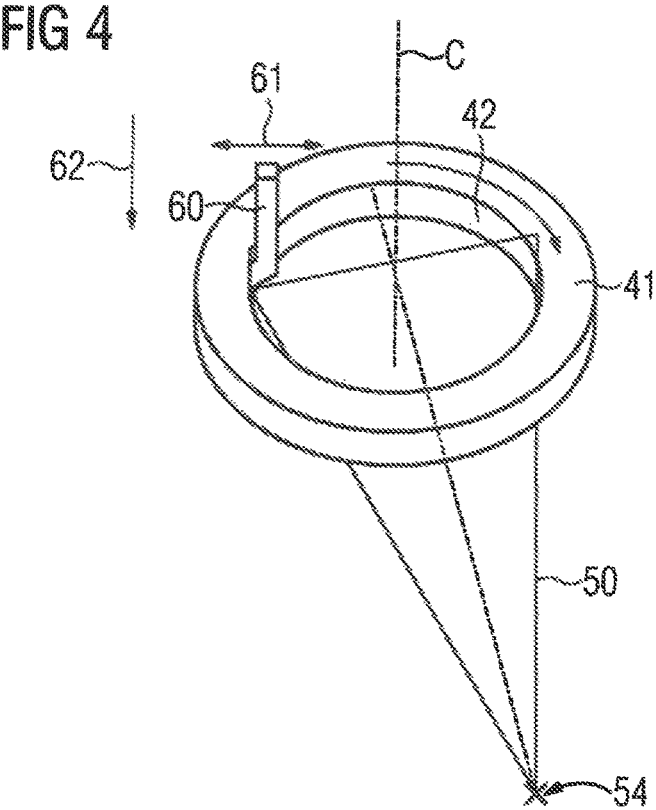
FIG. 4 shows a turning operation of a sealing face of a triple eccentric shut-off valve, shown in FIGS. 2 and 3, with a compensating movement through a linear axis of the machine tool.

FIG. 4 illustrates the turning operation of the valve seat 41 (only the substantially hollow-cylindrical part of the valve seat 41 that is essential for the machining is shown) of the triple eccentric shut-off valve 40 in accordance with FIG. 3. For machining, the valve seat 41 (corresponding to the workpiece 5 in FIG. 1) rotates at a preferably constant angular velocity about the axis of rotation C (see also FIG. 1) and a turning tool 60 that can be adjusted in at least two linear axes (corresponding to the tool 1 in FIG. 1) carries out metal-cutting machining. A compensating movement of the turning tool 60 to compensate for the aforementioned eccentricities along a first linear axis 61 is shown, for example the X axis shown in FIG. 1, the compensating movement taking place synchronously with the rotation of the valve seat 41 per revolution of the valve seat 41. Further, a second linear axis 62 for the infeed movement of the turning tool 60 is shown, for example the Z axis shown in FIG. 1.

Besides the aforementioned constant angular velocity of the rotation about the axis of rotation C, any angular velocity, even one that varies over time, can in principle come into consideration. In a preferred embodiment, the angular velocity of the rotation is defined—in a manner known per se—such that a constant cutting velocity results.

In accordance with the invention a corresponding cycle is started and executed for the corresponding machining of the valve seat 41 on the CNC machine. The machining is preferably performed starting on a hollow-cylindrical workpiece blank.

The geometric information required for manufacturing the sealing faces, as well as the manufacturing-related information, is in this case requested particularly conveniently by the operator using a cycle mask displayed on an HMI screen of the CNC controller. Alternatively the manufacturing cycle could also take place by the parameters being input manually in the parts program (without an HMI mask).

Table 1 below contains an exemplary summary of interactively editable parameters on the CNC controller, which can be requested using the cycle mask following a corresponding cycle retrieval. Besides a preferred designation of the respective parameter, Table 1 likewise shows a brief description and where appropriate a unit of measurement for the parameter in question. Depending on the form of description the actual parameter inputs required in each case may vary or may be derived from other specifications not mentioned here.

TABLE 1

Input parameters for the machining cycle on the CNC controller.

| Parameter | Description | Unit |
| --- | --- | --- |
| PRG | Program name | |
| | Name of the program to be generated | |
| RAX | Rotary axis | |
| | Rotary axis on which the workpiece is clamped | |
| IAX | Infeed axis | |
| | Linear axis which radially maps the eccentric compensating movement to the center of rotation | |
| MAX | Machining axis | |
| | Linear axis which maps the infeed movement along the lateral face of the cone (revolution feed) | |
| Contour preference | This parameter can be used to define the contour reference | |
| | Internal | |
| | The machining takes place inside the defined cone, typically for the housing | |
| | External | |
| | The machining takes place outside the defined cone, typically for the valve | |
| Machining | Machining direction | |
| | Establishes in which direction the rotary axis (RAD) rotates; this should be selected to match the alignment of the turning tool | |
| Format | Polar | |
| | Cartesian | |
| RP | Return plane | mm |
| | During machining the tool travels in rapid motion from the tool change point to the return plane and then to the safety clearance. At this height a switch is made to the machining feed. On completion of machining the tool travels in the machining feed out of the workpiece to the height of the safety clearance. It then travels in rapid motion from the safety clearance to the return plane and further to the tool change point. The return plane is input as absolute. The reference point Z0 and the return plane RP generally have different values. The cycle assumes that the return plane is situated ahead of the reference point. | |
| SC | Safety clearance | mm |
| | The safety clearance establishes the distance to the material that is no longer traversed in rapid motion. The cycle automatically establishes the direction of working of the safety clearance. The safety clearance generally works in multiple directions. The safety clearance is input incrementally (unsigned). | |
| S | Machining speed | 1/min |
| SR | Reduced speed for the startup | 1/min |
| Z0 | Reference point | mm |
| | Reference point in Z | |
| Z1 | End depth | mm |
| | Depth in relation to Z0 | |
| F | Machining feed | mm/rev |
| | This parameter describes the feed per revolution | |
| DCX | Distance between axis of rotation and tip of cone | mm |
| DCZ | Distance between tip of cone and Z0 | mm |
| DCE1 | Distance to cone corner 1 | mm |
| DCE2 | Distance to cone corner 2 | mm |

Figure 5:
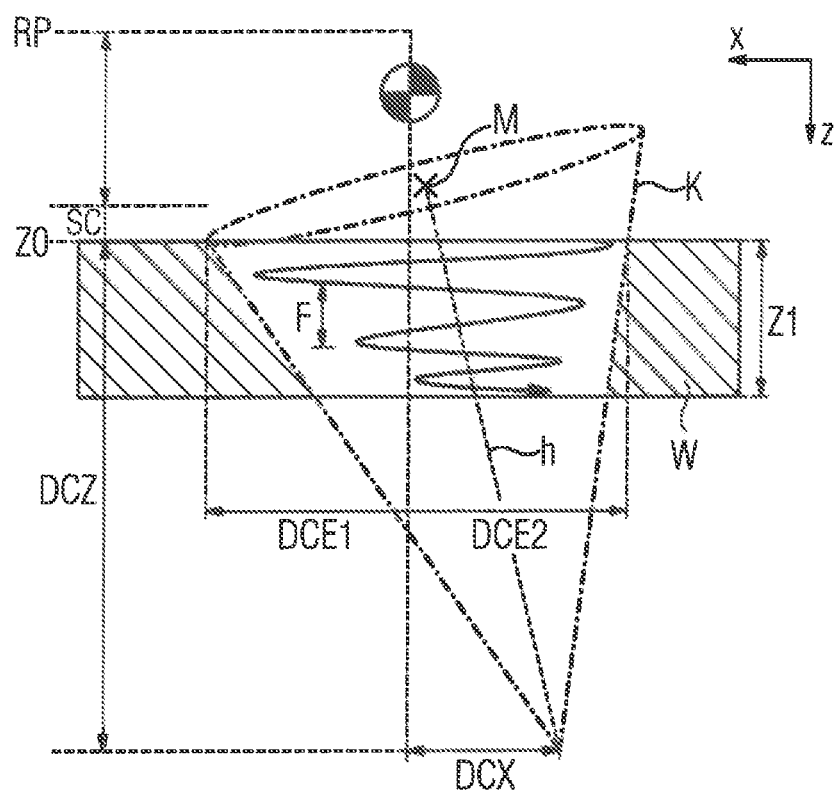
FIG. 5 shows some parameters queried when the cycle is retrieved and relating to the geometry of the sealing face.

FIG. 5 illustrates graphically some of the parameters that are requested during the cycle retrieval and that can be seen in Table 1.

The parameters shown provide all the specifications required to define the visible straight circular cone K and thus for the geometric description of the face to be produced. In particular, it can be seen in the figure that the cone K is pivoted ("turned") in space in comparison to a surface normal of the workpiece running in the Z direction. This means that a height line h of the straight circular cone with the center point M of the base area is not aligned in parallel to the surface normal of the workpiece and thus not in parallel to the Z axis of the machine tool.

After entering all the requisite parameters, a (CNC) parts program is generated fully automatically using the CNC controller, and can either be started immediately on the machine tool or alternatively is generated and executed at runtime based on user inputs. Thus no specific postprocessor is required, as would be necessary when creating the program using a CAM system, since the machine information required (number, type and position of the axes; maximum traversing ranges of the axes, etc.) for the algorithm are directly available or known here.

The tool path to be traversed by the tool relative to the workpiece generally runs on the lateral face of the cone segment in question. In the exemplary embodiment the cone is a straight circular cone K and the cone segment is an annularly closed segment of the lateral face of the cone K produced by the intersection of the cone K with the workpiece W. The invention is however not restricted to this cone shape or lateral shape. Further relevant for technical applications are in particular faces that relate to an oblique cone, in particular an oblique circular cone. The face sought is generally produced by the intersection of the cone in question with the workpiece blank (see FIG. 5).

In the exemplary embodiment in accordance with FIG. 5, in which a straight circular cone K is rotated in comparison with a surface normal of the workpiece, i.e. is pivoted in space, an intersection of the cone through a plane parallel to the workpiece surface of the workpiece W generates an ellipse.

If the infeed movement (Z direction) is disregarded, the result would be elliptical paths for the machining. Taking account of the infeed movement results in substantially elliptical, spiral-shaped path sections running around the lateral face of the cone segment in question, as is indicated by the curve shown in FIG. 5. A tool path 70 such as this (also called a movement path or just a path) is also shown by way of example in FIG. 6, the infeed in the Z direction being shown as substantially enlarged for clarity compared to an infeed corresponding to an actual machining operation. For machining of the corresponding workpiece W the tool must hence move relative to the workpiece substantially along elliptical, spiral-shaped path sections.

In the cycle according to the invention the movement path 70 is advantageously described or generated in the form of a plurality of directly adjacent splines, in other words polynomials of the highest $n^{th}$ degree. This is particularly advantageous when such splines are processed directly by the CNC controller, i.e. can be used for the control of the relative movement between tool and workpiece by retrieving corresponding commands, as is the case for example with the SINUMERIK 840D CNC controller from Siemens for polynomials up to the $5^{th}$ degree. The output format here is not a normal G code, consisting of straight lines or segments of a circle, but a polynomial code. Analogously to the G code customary in parts programs, the individual program instructions (commands) can in this way be generated block by block in the form of polynomial calls and can then be executed. The spline (polynomial) code generated in this way means that the individual spline segments can transition into one another "smoothly" (in a multiple continuously differentiable manner).

Figure 6:
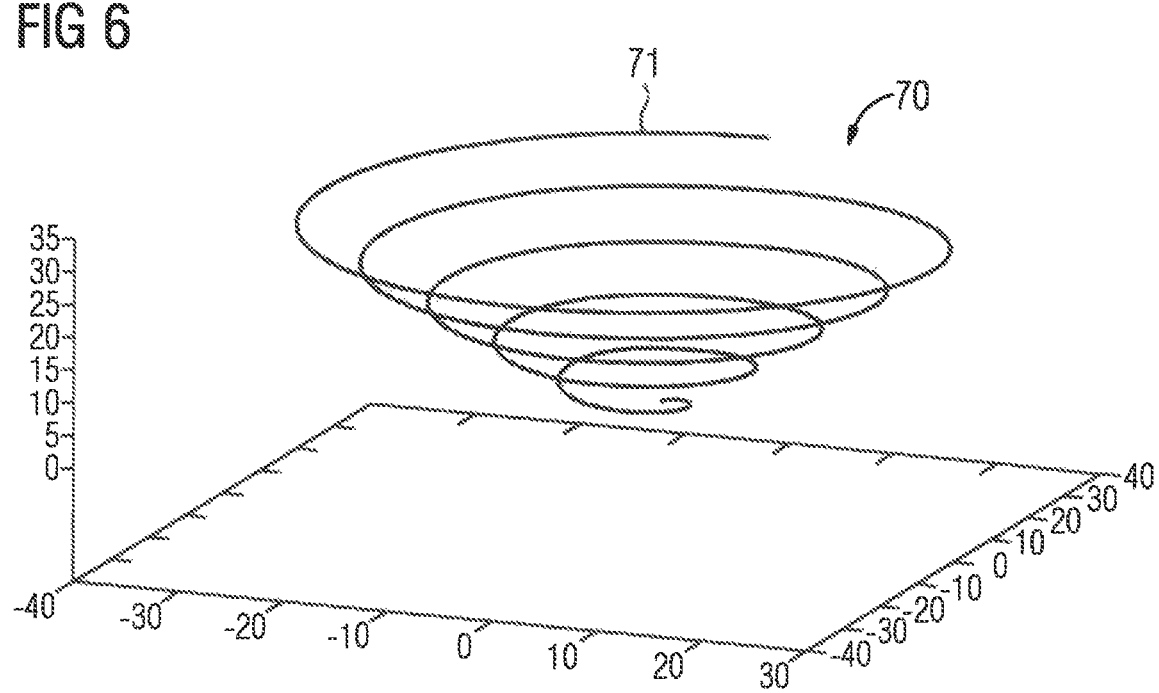
FIG. 6 shows a tool path composed of a plurality of directly adjacent splines.

The movement path 70 path shown in FIG. 6 consists of many path segments in the form of splines 71, in other words polynomials, that transition into one another in a multiple differentiable manner. Thanks to the "smooth" transition between the splines, the start and end of an individual spline 71 cannot be seen in the movement path 70.

A preferred form of embodiment is described below for path generation on the lateral face of the cone and thus on the aforementioned splines.

For the technological description the path is (notionally) unrolled on the cone. In this case a certain infeed per revolution should be taken into account. As an illustration, a ball-end cutter can be imagined which rotates about the face of the cone and in this case moves continuously downward (or upward) on the cone.

To calculate a revolution from 0° to 360°, a subdivision is for example made into 32 angular segments. An angular segment is therefore 11.52° wide. Within an angular segment six equally divided horizontal intersections between the start height of the angular segment and the end height of the angular segment are calculated. Six points are then defined on the ellipses. The first point lies on the first ellipse at 0°. The second point lies on the second ellipse at 2.304°. The third point lies on the third ellipse at 4.608°. The further points are further defined in accordance with this pattern.

Figure 7:
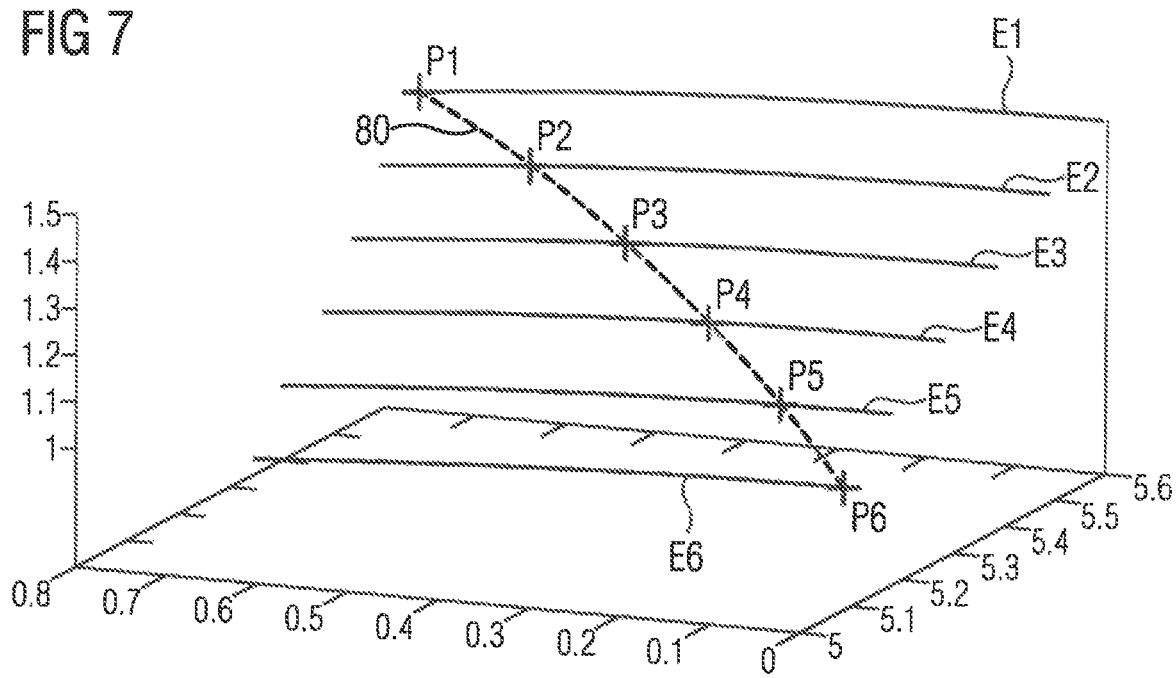
FIG. 7 shows a representation of points on elliptical segments for the formation of a spline.
Figure 8:
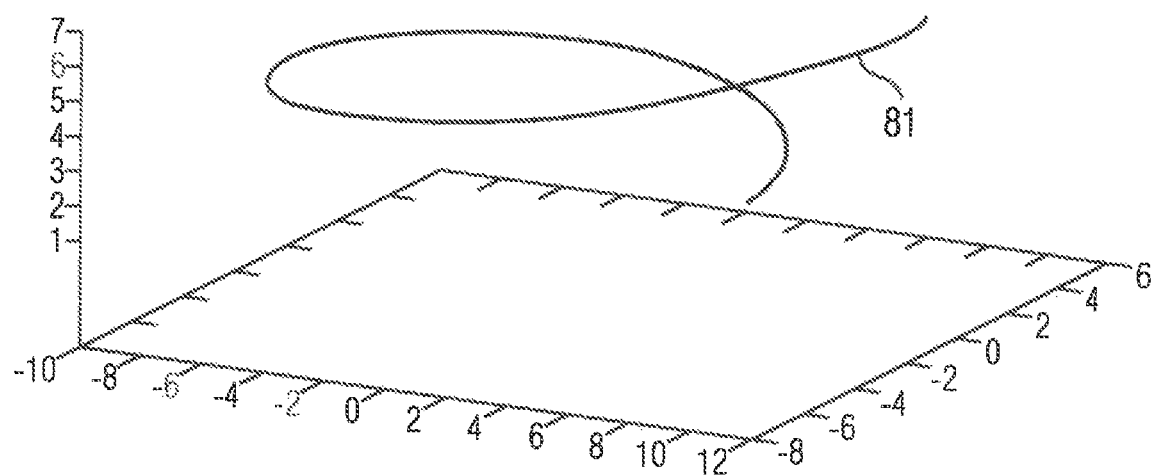
FIG. 8 shows a spline segment for one revolution.

The procedure shown is illustrated in FIG. 7. The six aforementioned ellipse segments E1 to E6 and the points P1 to P6 lying respectively on the ellipse segments are shown. The points P1 to P6 lying on the ellipses E1 to E6 are connected to a spline 80. In a continuous definition of the splines for the further angular segments the continuous path can be defined for one revolution around the cone. A corresponding path section 81 is illustrated in FIG. 8. Many such continuous path sections of this type ultimately result in the path 70 illustrated in FIG. 6.

In connection with the invention, the tool path is advantageously not described in a Cartesian coordinate system, but in a polar coordinate system that is better suited for at least substantially circular movements. The SINUMERIK 840D CNC controller from Siemens is also ideal for this. A coordinate transformation between the different coordinate systems is also possible in one form of embodiment of a cycle according to the invention.

Further, in a preferred form of embodiment of the invention, a tool radius correction, known per se, is carried out during the machining of a workpiece by means of a tool. The tool radius correction permits the programming of the workpiece contour regardless of the geometry of the tool used. Hence during the parameterization of the cycle a tool radius can also advantageously be detected, which is taken into account during the path generation using the numerical controller.

Figure 9:
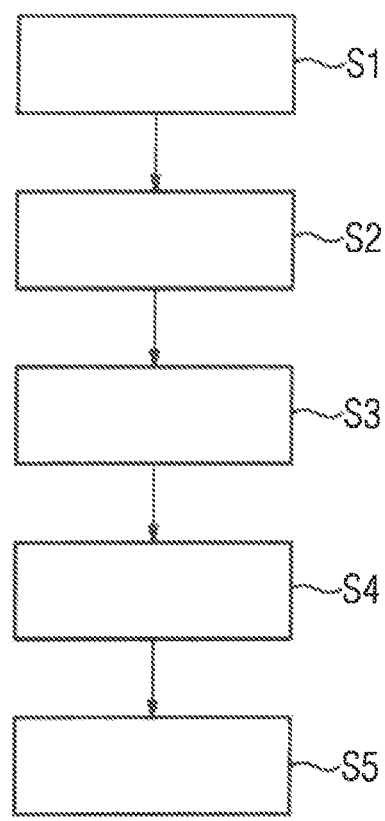
FIG. 9 shows method steps in the performance of a method in accordance with the invention.

The essential method steps in the performance of a method according to the invention are illustrated once again below in the form of a flow diagram in accordance with FIG. 9.

In a first method step S1 an executable cycle for producing and/or machining non-conical faces of a workpiece that can be defined by a segment of a cone is provided on a numerical controller of a machine tool connected to the controller.

In a method step S2 the cycle is retrieved by a user of the machine tool on a graphical user interface of the numerical controller of the machine tool.

In a method step S3 the user inputs the technology and geometry specifications required for the production or machining of the intended face of the workpiece on the graphical user interface of the numerical controller. The cycle is thereby "parameterized".

In a method step S4 account is taken of the inputs made in method step S3 and a parts program that can be executed by the numerical controller is generated by the numerical controller and is stored in a memory of the numerical controller. Recourse can thereby once again be had to the parts program during the production or machining of structurally identical workpieces.

Besides the usual G code instructions, polynomial code instructions are advantageously also generated in the case of the parts program generated in this way, so that the individual segments of the tool path established by the parts program are made up not only of straight lines and segments of a circle, but at least in part also of polynomial segments (splines).

In a method step S5 the parts program created in this way is executed on the numerical controller and thus the machine tool for producing or machining the non-conical face of the workpiece that can be defined by a segment of a cone. Linked to this is the relative movement between the tool and the workpiece established by the parts program.

The invention claimed is:

1. A method for producing or machining a non-conical sealing face of a closure part or a non-conical sealing face of a valve seat of a shut-off valve using a machine tool having at least two linear axes and at least one rotary axis for generating a relative movement between a tool and the closure part or the valve seal, said method comprising:
   defining the non-conical sealing face by a segment of a cone;
   retrieving an executable cycle for producing or machining the non-conical sealing face by a user of the machine tool on a graphical user interface of a numerical controller of the machine tool which controls the linear and rotary axes;
   parameterizing the retrieved cycle by user input of geometric specifications of the segment of the cone defining the non-conical sealing face and input of manufacturing specifications for producing or machining the non-conical sealing face on the graphical user interface of the numerical controller;
   generating a parts program executable by the numerical controller with the parameterized cycle and the numerical controller without recourse to an external CAM system; and
   executing the parts program by the numerical controller to generate relative movement along a path defined by the parts program for producing or machining the non-conical sealing face.

2. The method of claim 1, wherein the non-conical sealing face is defined by the segment of an oblique cone, in particular of an oblique circular cone.

3. The method of claim 1, wherein the non-conical sealing face is defined by a straight circular cone, having a height line which is not parallel with a workpiece normal.

4. The method of claim 1, wherein the non-conical sealing face is embodied as a circular closed cone segment.

5. The method of claim 1, wherein the non-conical sealing face is machined by a turning operation.

6. The method of claim 1, wherein the shut-off valve is an eccentric, in particular a multiple-eccentric shut-off valve.

7. The method of claim 6, further comprising executing a radial compensating movement to compensate for an eccentricity in at least one linear axis of the machine tool.

8. The method of claim 1, wherein the parts program is generated at least partially in a polar coordinate format.

9. The method of claim 1, wherein the parts program is generated at least partially in a Cartesian format.

10. The method of claim 1, wherein the cycle generates the path at least partially in the form of directly adjacent splines, in particular $5^{th}$-order splines.

11. The method of claim 1, wherein the tool defines a tool radius and the parts program takes into account the tool radius, in particular in form of a tool radius correction.

12. The cycle of the numerical controller configured to execute the method as set forth in claim 1.

13. The numerical controller comprising the cycle and configured to execute the method as set forth in claim 1.

14. The machine tool comprising the numerical controller configured to execute the method as set forth in claim 1.

15. The method of claim 1, wherein the non-conical sealing face is further defined by specifications relating to size and position of a face on a lateral face of the cone.

* * * * *